United States Patent [19]
Dean et al.

[11] Patent Number: 4,592,563
[45] Date of Patent: Jun. 3, 1986

[54] RECREATIONAL VEHICLE

[76] Inventors: James Dean, 514 N. Van Buren St.; Paul D. Bridges, 703 Houston St., both of Batavia, Ill. 60510

[21] Appl. No.: 658,873

[22] Filed: Oct. 9, 1984

[51] Int. Cl.$^4$ .......................... B62M 1/04; B62K 21/10
[52] U.S. Cl. .................................... 280/253; 280/268; 280/281 LP
[58] Field of Search .............. 280/239, 253, 255, 258, 280/261, 267, 281 LP, 263, 268

[56] References Cited

U.S. PATENT DOCUMENTS

| | | | |
|---|---|---|---|
| 2,638,359 | 5/1953 | Crumble | 280/253 |
| 3,888,512 | 6/1975 | Peterson | 280/255 |
| 3,913,929 | 10/1975 | Matsuura | 280/261 |
| 4,052,912 | 10/1977 | Vukelic | 280/253 |
| 4,445,702 | 5/1984 | Reyes | 280/239 |
| 4,506,902 | 3/1985 | Maebe | 280/267 |

FOREIGN PATENT DOCUMENTS

| | | | |
|---|---|---|---|
| 497176 | 11/1919 | France | 280/253 |
| 10036 | 5/1901 | Norway | 280/267 |
| 2044194 | 10/1980 | United Kingdom | 280/255 |

*Primary Examiner*—John J. Love
*Assistant Examiner*—Charles R. Watts
*Attorney, Agent, or Firm*—Hill, Van Santen, Steadman & Simpson

[57] ABSTRACT

A recreational vehicle has a seat for a rider, mounted on a frame, steering apparatus, and a drive train for supplying driving power to a drive wheel incorporating a pair of reciprocating pedals connected to the drive wheel through one way clutches. The pedals are connected to the clutches by cables which operate to return each pedal as the other receives power from the rider. The vehicle has three sets of wheels, and two handles which are effective for steering all three sets of wheels (or other supports, such as skates) independently. The vehicle is braked by steering two sets of wheels in opposite directions.

15 Claims, 12 Drawing Figures

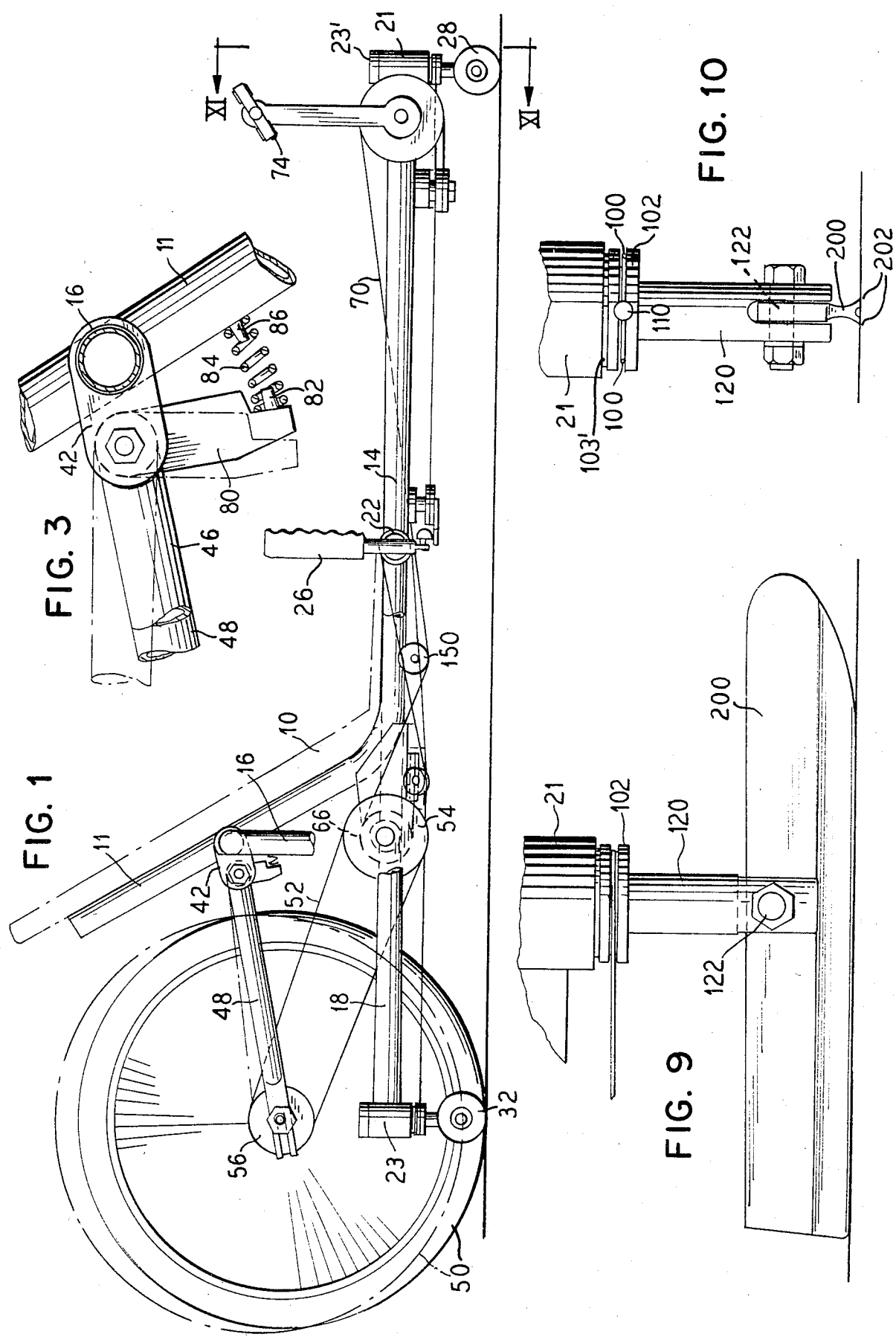

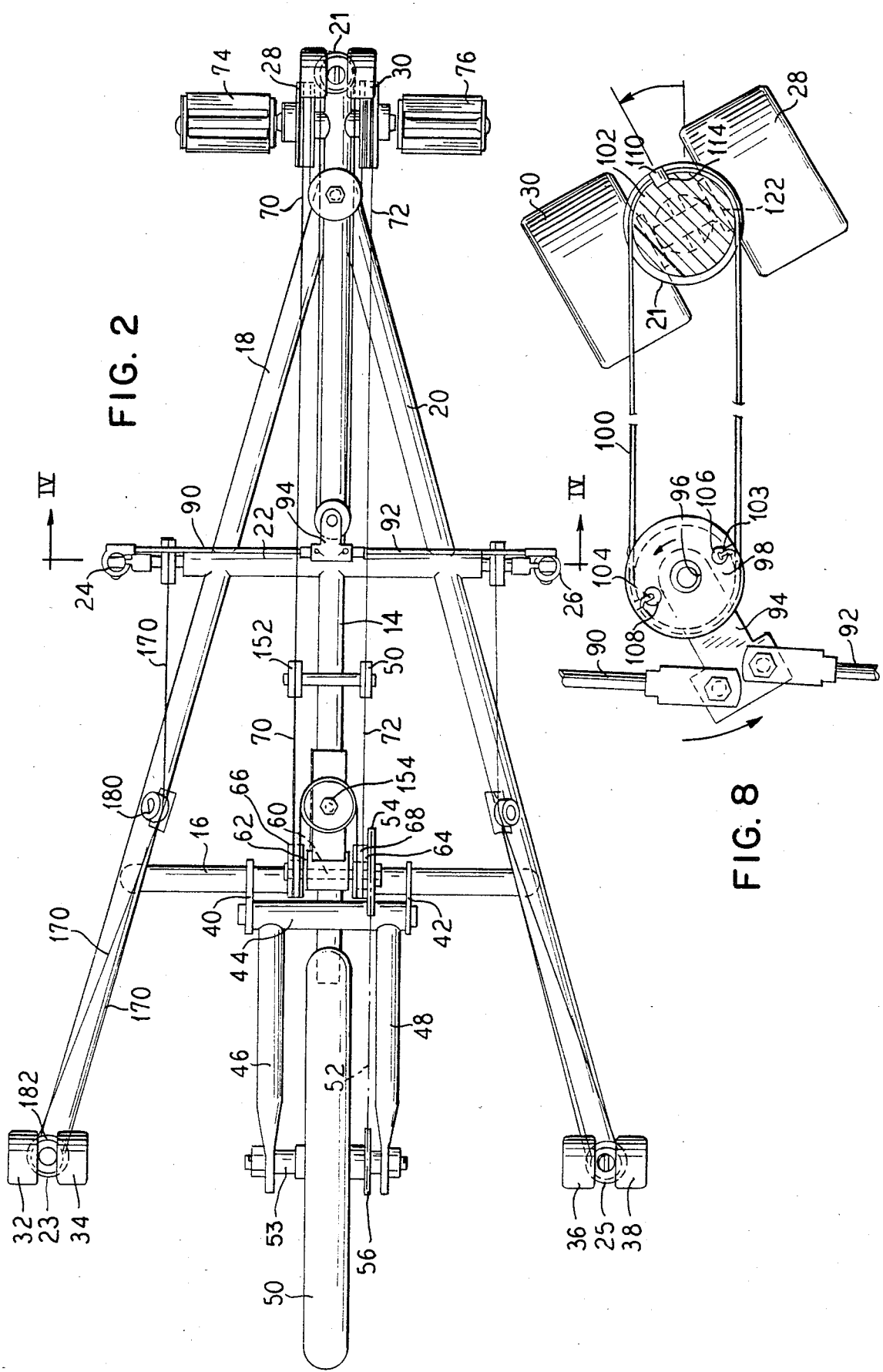

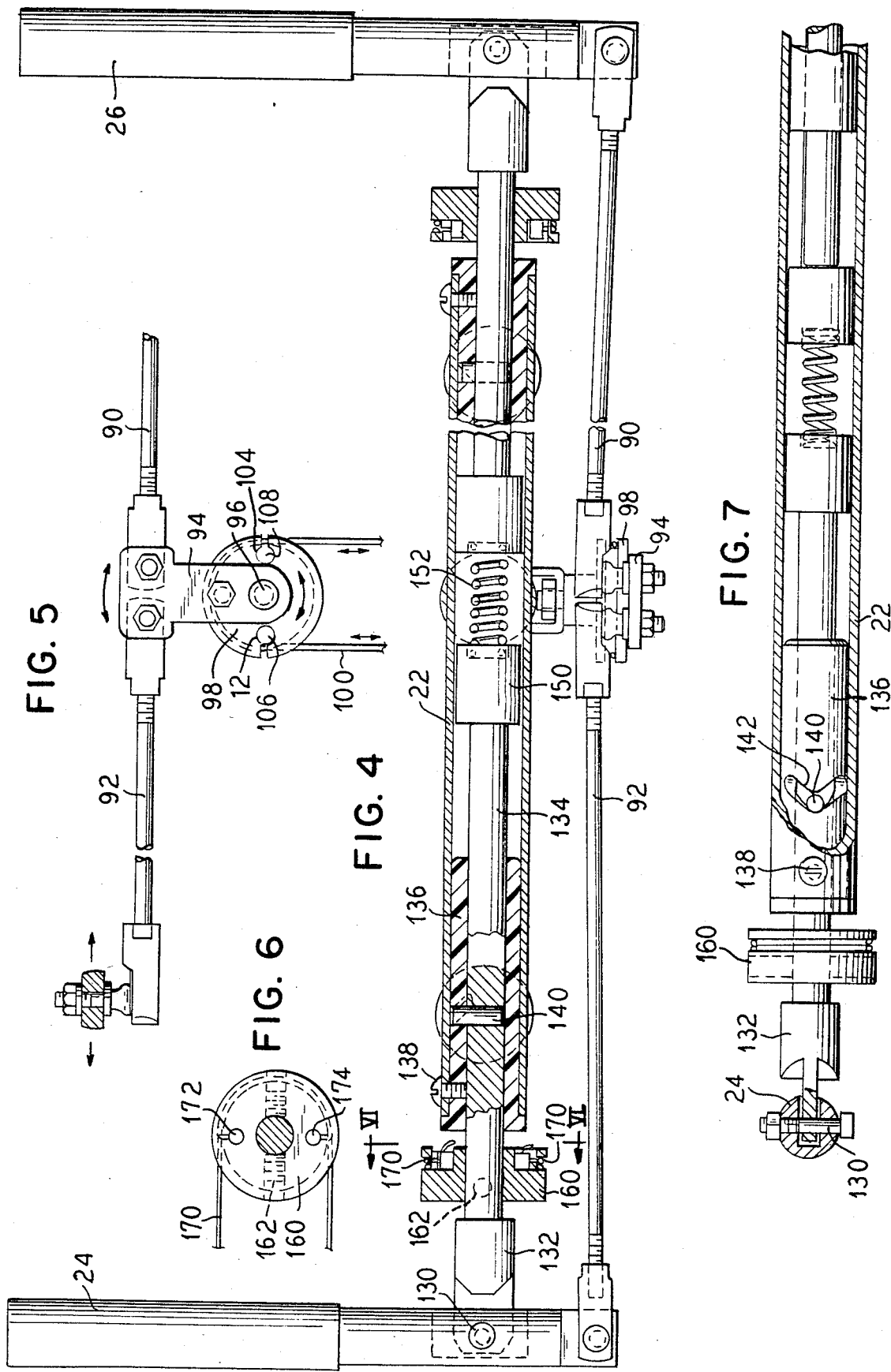

RECREATIONAL VEHICLE

BACKGROUND

1. Field Of The Invention

The present invention relates to recreational vehicles and more particularly to single rider vehicles which are powered solely by a rider.

2. The Prior Art

A number of rider powered vehicles have been developed, and of these, the conventional bicycle has emerged as the most popular and/or successful. A conventional bicycle has a number of disadvantagous features of operation, however, which make improvements in its construction and operation desirable. For one thing, the rotary pedals, located at a position beneath the seat, are not well adapted to achieving maximum performance in transmitting power from the rider to the drive train, and are also limited in their capacity for sudden changes in speed and direction. During periods in which the cranks of the pedals are aligned with the rider's legs, no torque is transmitted from the rider to the power train.

Also, the steering of a conventional bicycle is limited to steering the front wheel alone, and braking is limited to slowing the rotation of one or both wheels.

Accordingly, it is desirable to provide a recreational vehicle which has improved constructional and operational characteristics so as to achieve improved overall performance characteristics.

BRIEF DESCRIPTION OF THE INVENTION

It is a principal object of the present invention to provide a recreational vehicle which has improved constructional and operational characteristics in comparison to a conventional bicycle.

Another object of the present invention is to provide a recreational vehicle which has separately steerable front and rear steering means.

Another object of the present invention is to provide improved drive means, by which the feet and legs of the operator may power the forward progress of the vehicle in a more efficient and easily controllable manner.

A further object of the present invention is to provide superior braking apparatus, by which a pair of wheels may be steered in opposite directions to provide braking.

These objects are achieved in the present invention by providing a recreational vehicle of the single rider type with plural front and rear supports or wheels means for selectively supplying drive power to a drive wheel of the vehicle by means of a reciprocal rather than rotary leg motion, and means for independently steering all of the supports or wheels.

These and other objects and advantages of the present invention will become manifest by an inspection of the following description and the accompanying drawings.

In one embodiment of the present invention there is provided a recreational vehicle having a seat for a single rider, a pair of reciprocating pedals located at about the same elevation as the seat, means for rotating a drive wheel in response to reciprocating motion of said pedals, and a pair of handles adapted to be manipulated by the hands of the operator, said handles adapted to separately steer front and rear supports or wheels of the vehicle in response to the operator manipulation.

BRIEF DESCRIPTION OF THE DRAWINGS

Reference will now be made to the accompanying drawings in which:

FIG. 1 is a side elevational view, partly in cross section, of an illustrative embodiment of the present invention;

FIG. 2 is a plan view of the apparatus of FIG. 1 viewed upwardly from the bottom;

FIG. 3 is an enlarged view of a portion of the apparatus illustrated in FIG. 1.

FIG. 4 is a vertical cross section of portion of the apparatus illustrated in FIG. 2, taken along the section IV—IV;

FIG. 5 is a plan view of a portion of the apparatus of FIG. 4, looking upwardly from the bottom;

FIG. 6 is a vertical cross sectional view of a portion of the apparatus shown in FIG. 4, taken along section VI—VI;

FIG. 7 is a horizontal cross sectional view taken centrally through the apparatus of FIG. 4;

FIG. 8 is an enlarged plan view of a portion of the apparatus shown in FIG. 2, illustrating the front steering mechanism;

FIGS. 9 and 10 are elevational views of a portion of a alternative embodiment of the present invention incorporating supports in the form of skates instead of wheels;

DESCRIPTION OF THE PREFERRED EMBODIMENT

Figure 11:
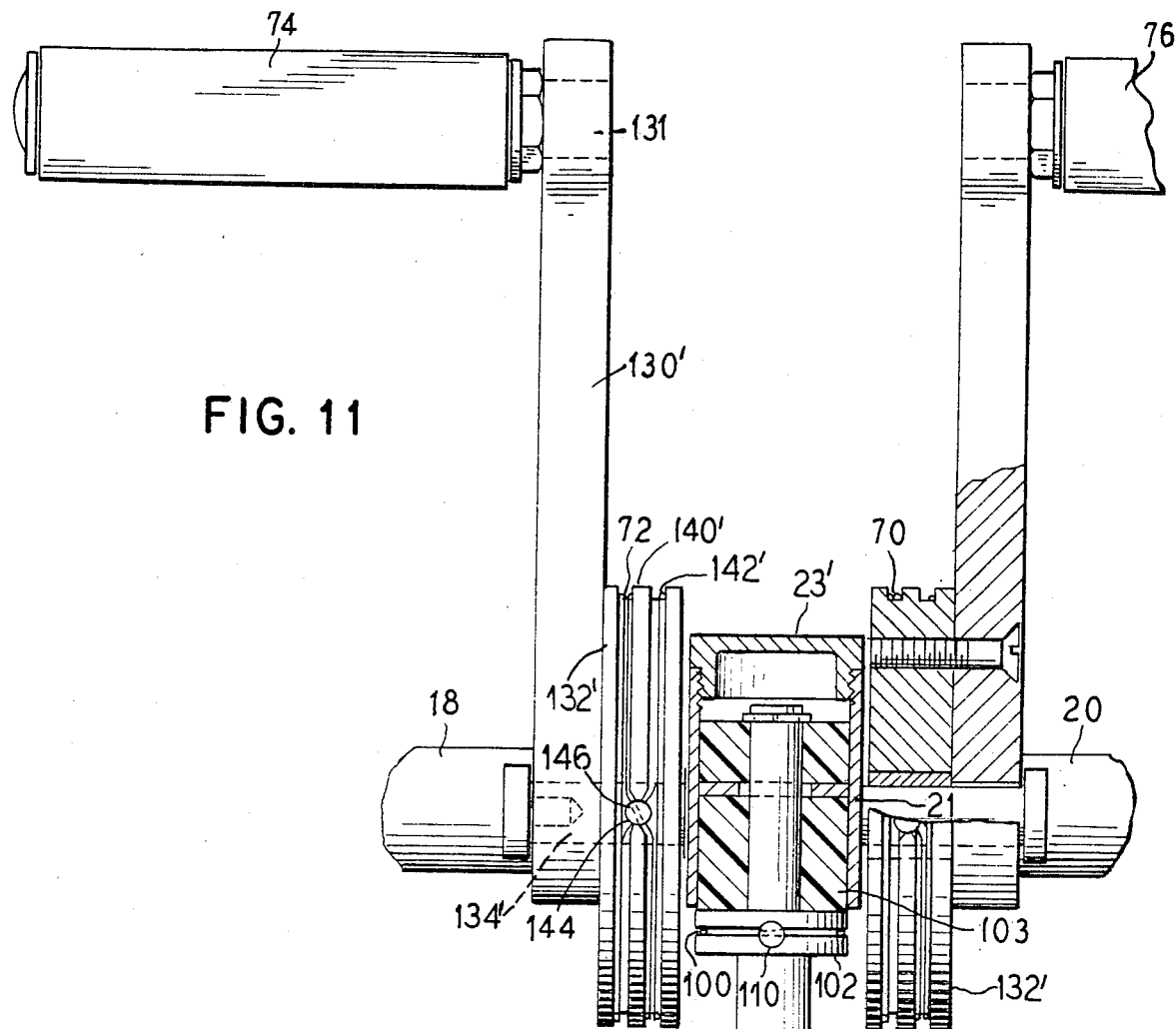
FIG. 11 is a elevational view, partly in section, of the drive pedal mechanism of FIG. 2, taken along the section line VII—VII.
Figure 12:
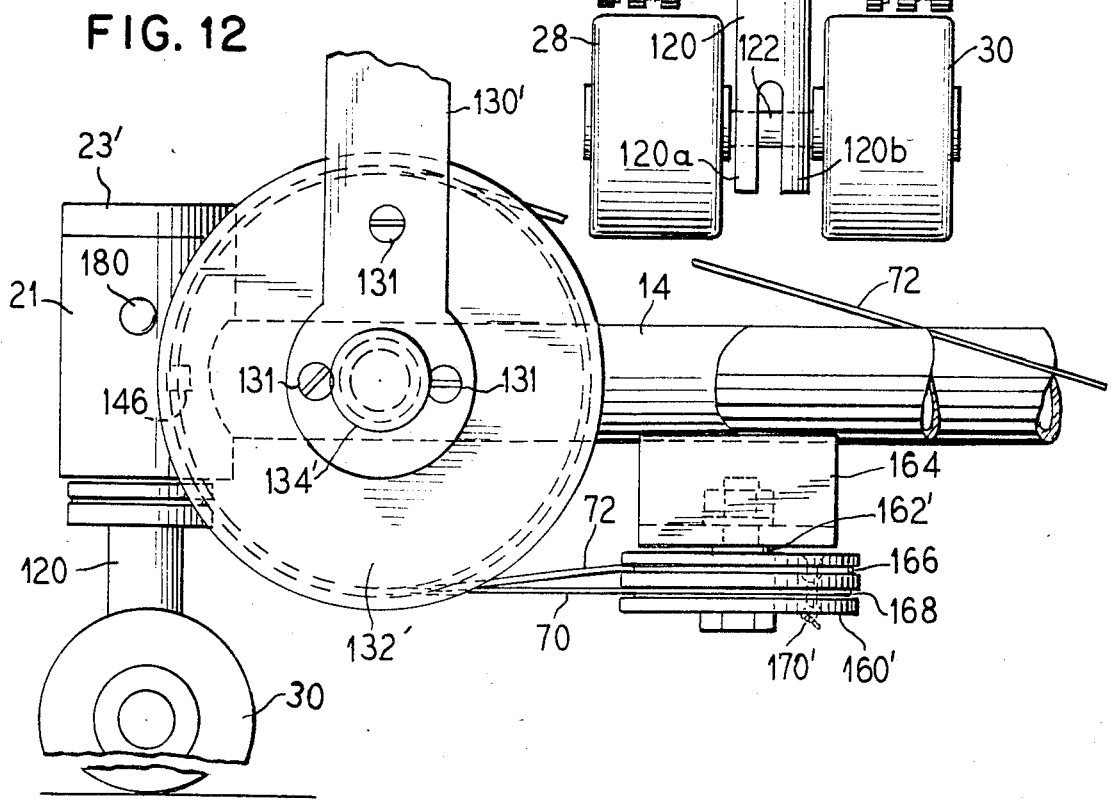
FIG. 12 is an enlarged side elevation of a portion of the pedal assembly.

Referring to the drawings;

FIG. 1 illustrates a side elevational view of a single rider wheeled recreational vehicle having a seat cushion 10 supported by a seat frame 11, which is mounted on a tubular frame member 14, which extends longitudinally. A pair of side frame members 18 and 20, which are both connected to the member 14 at the front end of the vehicle, diverge in the form of a V, and interconnect with a horizontal strut 22 which is also connected to the member 14. A rear frame member 16 interconnects the side members 18 and 20. The frame member 16 is arranged in the form of an inverted U, with its top arranged to support the rear of the seat 10. The strut 22 extends outwardly beyond the side frame members 18 and 20 and terminates in a pair of handles 24 and 26, by which the vehicle can be steered, as more fully described hereinafter.

A bearing housing 21 is secured to the frame member 14 at its forward end, and a front pair of wheels 28 and 30 are mounted thereon. Right and left pairs of wheels 32–38 are mounted to housings 23 and 25 at the ends of the frame members 18 and 20.

Pivotally mounted to the V-shaped frame member 16, is a yoke formed of two arm members 40 and 42 and an interconnecting member 44. The interconnecting member 44 forms a second, rearwardly extending yoke with side members 46 and 48, and a shaft 53 mounted on the ends of the yoke members 46 and 48 supports a rotatable drive wheel 50.

The drive wheel 50 is driven by a chain 52 via a forward sprocket 54 and a rear sprocket 56. The rear sprocket 56 is keyed to the shaft 53 so that the wheel 50 is turned in response to drive supplied by the chain 52.

The forward sprocket 54 is keyed to a shaft 60 which shaft is connected to right and left clutches 62 and 64. Each clutch has one of a pair of pulleys 66 and 68 connected to it, so that rotation of either the pulleys causes rotation of the shaft 60. Both of the clutches 62 and 64 are one way clutches, incorporating a rachet and pawl mechanism, so that rotation of the shaft 60 is possible in only one direction of rotation, corresponding to the forward drive direction for the drive wheel 50. In operation, as described more fully hereinafter, the pulleys 64 and 66 are rotated simultaneously but in opposite directions, with each pulley rotating sequentially clockwise and then counterclockwise.

The pulleys 64 and 66 are caused to rotate by virtue of cable 70 and 72 (two lengths of a single cable) which pass therearound.

A pair of pedals 74 and 76, located at the front end of the apparatus, provide the motive power for moving the cable lengths 70 and 72. The pedals 74 and 76, unlike conventional bicycle pedals, do not rotate in a complete circle, but are designed to be reciprocated, simultaneously in opposite directions, by the two feet of the rider. By this means, the cable lengths 70 and 72 are alternately reciprocated, causing the clutches 62 and 64 to rotate the shaft 60, by which the drive wheel 50 is driven through the chain 52. The yoke which mounts the drive wheel, including the end members 46 and 48 and the connecting member 44, are pivoted about the frame member 16 through arms 40 and 42. This allows the drive wheel 50 to assume a lower position, illustrated in full line in FIG. 1, where the drive wheel is in contact with the ground. When driving power is not required, however, the drive wheel 50 is raised by pivoting the arms 46 and 48 upwardly, thereby lifting the drive wheel from the ground and eliminating friction between the drive wheel and the ground.

FIG. 3 illustrates the mechanism by which the drive wheel 50 is lifted automatically at all times when the power is not being applied to rotate the drive wheel.

As shown in FIG. 3, the member 46 has a downwardly depending finger 80, which is fixed and rotates therewith. A pin 82 is secured to the forward side of the lower end of the finger 80, and a spring is positioned with one end surrounding the pin 82. Another pin 86 protrudes rearwardly from the member 11, to receive the other end of the spring, whereby the spring 84 is held in place between the pins 82 and 86. The spring 84 is a compression spring and tends to force the finger 80 outwardly relative to the frame member 11, with the effect of raising the yoke which supports the drive wheel 50, and lifting the drive wheel 50 off the ground. Such movement of the drive wheel is accommodated by a small amount of slack in the chain 52, which is taken up during rotation of the yoke. When drive is being applied by the chain 52, however, rotation of the sprocket 54 tensions the upper reach of the chain 52, and applies a downwardly directed force to the yoke. By this means, the drive wheel is brought downwardly into engagement with the ground, at all times when power is being applied thereto through the chain 52.

The handles 24 and 26 are provided for steering both the forward wheel pair 28 and 30, and the rear wheel pairs 32–38. Turning of the front wheel pairs is accomplished by a rolling motion imparted to the handles 24 and 26, that is, rotation of the handles about a horizontal axis extending parallel to the longitudinal or forward-ing-rearward direction of the vehicle. A pair of tie rods 90 and 92 are each pivotably connected to the lower ends of the handles 24 and 26 and a bell crank 94, so that reciprocation of the tie rods 90 and 92 causes rotation of the bell crank 94, and the bellcrank links the handles together so that they operate together in steering the front wheel pair. An enlarged view of this mechanism is illustrated in FIG. 8. The bell crank 94 is mounted for rotation on a shaft 96 which is supported by the frame member 14, and a drive pulley 98 is also mounted for rotation on the shaft 96, so that rotation of the bell crank 94 rotates the drive pulley 98 about the shaft 96. A steering control cable 100 is wrapped around the pulley 98 and extends forwardly therefrom to wrap around a forward pulley 102 and then returns to the drive pulley 98.

The cable 100 is a length of cable which has one end received in a recess 103 of the pulley 98, while the other end of the cable is received in a recess 104. Lugs 106 and 108, respectively, are swaged to the ends of the cable, and are received in the respective recesses 102 and 104, to hold fast the respective ends of the cable 100 relative to the pulley 98. The recesses 102 and 104 preferably take the form of bores drilled in the pulley 98 in a direction parallel with its axis, with a small opening cut into each of the bores from the periphery of the pulley 98, so that the recesses receive the lugs 104 and 106 and hold them trapped, so that the cable 100 is held fast at both ends. The forward pulley 102 has a peripheral groove for receiving and locating the cable 100, and a lug 110, which is welded or otherwise fixed to the cable 100, is received in a recess 114 in the forward pulley 102. The lug 100 prevents the cable 100 from slipping relative to the forward pulley 102, so that movement of the cable in response to rotation of the drive pulley 98 exerts a positive driving rotation on the forward pulley 102.

The forward pulley 102 is fixed to a shaft 120 for rotation therewith, which shaft is rotatably received in a bearing 103' within the housing 21. The bearing 103', which is preferably formed of Teflon or the like, extends below the housing 21 to allow free rotation of the pulley 12. A cap 23' is threaded to the upper end of the housing 21 to allow lubrication and to facilitate assembly. The shaft 120 is bifurcated at its lower end into two sections 120a and 120b, and a wheel shaft 122 is supported in aligned apertures therein. The forward wheels 28 and 30 are mounted on the shaft 22, so that rotation of the vertical steering shaft 120, in response to rotation of the forward pully 102, operates to turn the forward wheels 28 and 30.

Referring now to FIG. 4, a side elevation, partly in section, of the steering mechanism, the steering handles 24 and 26 are shown. As the steering mechanism is symmetrical on both sides, only one side will be described in detail. The handle 24 is mounted by means of a shaft 130 for rotation relative to an end member 132 which is secured to the end of a shaft 134. The shaft 134 is mounted within the frame member 22 for reciprocating and rotary motion relative thereto.

An insert 136 is received at the outer end of the frame member 122 and fixed in position by means of a screw 138. The insert 136 serves as a bearing for the shaft 134. The shaft 134 has a pin 140 which extends generally vertically, and is received in a slot 142 in the insert member 136. The slot 142 is "V" shaped as shown in FIG. 7. An end member 150 is disposed within the frame member 22 adjacent to the inner end of the shaft 134, with a recess to receive one end of a compression spring 152. The other end of the compression spring 152 bears against an end member corresponding to the end member 150, for the mechanism connected with a handle 26. The spring 152 forces the shaft 134 outwardly, causing the pin 140 to be normally located in the central position as illustrated in FIG. 7. This is the position corresponding to no turning of the rear wheel pairs 32-38.

The shaft 134 can be rotated, within the sleeve 136, by means of the handle 24. As it does so, the pin 140 assumes a position within the slot 142 which is one side or the other from its central position, and the ends of the slot 142 limit the amount by which the shaft 134 can be rotated to about 45°.

A drive pulley 160 is fixed to the shaft 134 for rotation therewith by virtue of a screw 162 extending through a threaded aperture provided in the drive pulley 160 and the shaft 134. FIG. 6 illustrates an elevation of the drive pulley 160, with the ends of the cable 170 being secured in recesses 172 and 174 in the same manner which has been described in connection with FIG. 8. The cable 170 passes about a pulley 180 mounted to the frame member 18 (FIG. 2), and then around a rear pulley 182 provided for steering the rear wheel pair 32 and 34. From there the cable 170 returns via the pulley 180 to the opposite side of the drive pulley 160.

The rear pulley 182 is connected with the rear wheel pair 32 and 34, in the same manner as the forward drive pulley 102 is connected with the forward wheel pair 28 and 30, for rotating the wheel pair in response to reciprocation of the driving cable. Like the arrangement for steering the forward wheel pair shown in FIG. 8, the pulley 182 has a recess for accepting a lug welded or otherwise fixed to the cable 170, for preventing slipping between the cable and the rear pulley 182.

From the above, it can be seen that rotation of the shaft 132, by moving the handle 24 forwardly or backwardly, can steer the wheel pair 32 and 34 independently of any other wheel pair. Similar means are provided for the handle 126, by which the wheel pair 36 and 38 may be steered. The cable 170 is wrapped around the rear pulley 182 in such direction that forward rotation (or pitching rotation) of the handle 24 results in the rear wheel pair 32, 34 turning outwardly, such that the rear of the vehicle tends to move leftwardly relative to its line of forward travel. In the same fashion, the corresponding cable is received about the rear pulley for the other rear wheel pair 36 and 38, so that forward movement of the handle 26 causes it to rotate outwardly, so that the rear of the vehicle moves in a rightward direction relative to the direction forward travel. When the handles 24 and 26 are moved so that these rotations are in the same direction, that is, either clockwise or counterclockwise, both rear wheel pairs contribute to relative motion of the rear end of the vehicle in the same direction. When a contrary rotation is provided to the two rear pulleys, however, the rear wheel pairs are rotated in opposite directions, which produces a braking effect on the vehicle. This is accomplished by moving the handles 24 and 26 both forward simultaneously, or both backward simultaneously in order to rotate the rear wheel pairs either outwardly or inwardly respectively.

By the means described above, the front and rear of the vehicle can be steered independently, so that the vehicle is highly maneuverable and is able to execute sideways or crabbing motions of which an ordinary bicycle is incapable. Also, no extra provision for breaking the vehicle need be provided, since the steering mechanism provided for the rear wheel pairs is inherently able to provide a braking action.

The mechanism by which the power is supplied to the rear drive wheel via the cable 70 and 72 will now be described.

Referring to FIG. 11, the pedal 74 is mounted on one end of a crank arm 130' which is mounted by screws 131 to a drive pulley 132', in turn mounted on a shaft 134' which is received in a horizontal aperture of the frame member 14. The pedal 74 is able to rotate relative to the arm 130' by virture of being mounted for rotation about a shaft 134 fixed to the end of the arm 130'.

As the pedal 74 is moved forwardly by the right foot of the operator, the pulley 132' is rotated about its axis. The cable 72 is wrapped about the pulley 132', so that it is reciprocated longitudanlly in response to the pulley's rotation.

As shown in FIG. 11, the pulley 132' has two peripheral grooves 140' and 142' for receiving the cable length 72. The cable 72 is wrapped multiple times about the pulley, in a manner which will now be described. A lug 144 is welded or otherwise secured to the cable and received in a recess 146 located at the forward side of the pulley between the grooves 140' and 142'. From the position of the lug 144, the cable 72 passes upwardly through the groove 140', and then completely around the pulley until it again reaches the upper portion of the groove, after which it proceeds rearwardly around an idler pulley 150 secured to the frame member 14 and thence to the forward sprocket 54.

The pedal 76 is connected to another pulley 132 which is just like the one described in connection with the pedal 74. The cable length 70 passes in like manner one and quarter times around a groove in the pulley and then rearwardly over a idler pulley 152 and around the pulley 62. The cable lengths 70 and 72 each proceed forwardly from their respective pulley 62 and 64 around an idler pulley 154, where they meet in order to form a continuous cable length. Thus forward movement of one of the cable lengths 70 and 72 is accompanied by reverse movement of the other, and vise versa. In this way, each of the pedals 74 and 76 is pushed forward by one foot of the rider, the other is pulled rearwardly by virtue of the other end of the cable 70-72.

Referring again to FIG. 11, from the recess 144, the cable 72 is wrapped downwardly and rearwardly through the groove 142', and then completely around the pulley in the groove 142' until it again approaches the downwardly portion of this groove. From there, it proceeds rearwardly to be received in a groove of a pulley 160' which is mounted for a rotation about a shaft 162' is secured to a member 164 which is welded or otherwise attached to the frame 14.

The pulley 160' has two grooves, 166 and 168, each of which receives one of the two cable lengths 70 and 72 respectively. The cable 70 is wrapped entirely around the periphery of the groove 168, and terminates in a lug 170' which is received in a recess of the pulley 160', in the same manner which has been described in connection with FIG. 8. The cable end 72 is received in the groove 166 and wraps completely around the groove 166 (in the opposite direction from the length 70), and is terminated with a lug secured in a recess. The cable 70 and 72 thus form a single cable having its two ends secured to lugs fixed in position relative to the pulley 160'. By this means, rotation of the pulley 160' feeds one of the cable lengths 70 or 72 forwardly, and at the same time accommodates rearward movement of the other. Because the cable lengths are wrapped around the pulley 160', the pulley operates as a cable reservoir, to supply cable as needed to either of the cable lengths 70 and 72, and to take up the other.

By virtue of the multiple wrap around the pulley 132' in the grooves 140' and 142', friction between the pedal drive pulleys 132 and their respective cable lengths 70 and 72 as effective for transmitting the force from the pedal and its crank arm 130 to the cable. Thus, there is relatively little stress on the lug 146, which has the function of locating the cable positively relative to the pulley 132, especially when there is little or no tension on either of the cables.

A stop 180 is provided on each side of the housing 21 in order to positively limit the forward motion of the crank arms 130 for each of the pedals 74 and 76. The action of the crank against the stop furnishes a tactile feedback to the rider that the end-most position of the pedal has been reached, so that the other pedal may then be reciprocated for continued forward drive of the rear wheel 50.

It is apparent from the foregoing that no rotary motion of the pedals or their crank arms is required, as is the case in conventional bicycles. Rather, the driving power is derived from the pushing action of the operator in a generally reciprocating manner, rather than a rotating one. The angular rotation of the crank arms 130 is limited to approximately plus or minus 60° from the vertical, so the crank arms is at all times in position to supply large amounts of torque to the drive pulleys, tensioning the cable lengths 70 and 72 which are responsible for driving the forward sprocket 54. At no time do the crank arms 130 become aligned with the longitudinal direction of the rider's legs, at which no torque can effectively be transmitted between the leg and the crank.

The driving apparatus of the present invention may advantageously be applied to conventional bicycles. In that case, the circular pedal arrangement of conventional bicycles, with their integral connection with the drive sprocket, is replaced by the limited motion crank assembly of the present invention, with the left foot crank and the right foot crank connected to one-way clutches for driving the drive sprocket in the forward direction. The one way clutches allow free wheeling motion of the clutches in response to forward movement of the bicycle during periods in which no power is being applied to the pedals.

Referring to FIGS. 9 and 10, an alternative embodiment of the present invention is illustrated in which skates are substituted for the wheel pairs described above. The skate 200 comprises an elongated blade formed of metal or the like, and having side edges for engaging the ground surface such as an ice surface covering a frozen body of water. The shaft 122, instead of mounting a wheel pair such as the wheels 28 and 30, extends through an aperture in the skate 200, and supports the skate while allowing limiting pivoting motion between the skate and the shaft 120. The steering of the vehicle is accomplished in the manner described above in connection with the wheel pairs.

Preferably, when the vehicle is used as an ice vehicle with skates, the drive wheel 50 is provided with studs or other means for enhancement of the traction on ice or surface of the ground.

From the foregoing, the present invention has been described with sufficient detail to enable others skilled in the art to make and use the same. It will be apparent that various additions and modifications may be made in the apparatus illustrated and described, without departing from the essential features of novelty thereof, which are intended to be defined and secured by the appended claims.

What is claimed is:

1. A recreational vehicle comprising a frame, a seat for a rider mounted on said frame, a drive wheel mounted on said frame and power means for rotating said drive wheel, said power means comprising a pair of cranks adapted to be rotated through a partial revolution by the feet of said rider between first and second positions, two lengths of cable, each connected to a separate one of said cranks, means interconnecting said lengths of cable for returning each of said cranks to said first position by rotating the same in one direction while the other crank is rotated in the opposite direction from its said first position toward its said second position, drive train means connected to said cranks for rotating said drive wheel, said drive train means comprising a drive shaft connected in operative driving relationship with said drive wheel, means including a pair of one-way clutches for connecting said cranks individually to said clutches, and means connecting each of said lengths to an individual one of said one-way clutches, whereby said drive shaft is driven alternately by said cranks through alternate ones of said lengths, and means for connecting the ends of said lengths together to form a continuous cable.

2. Apparatus according to claim 1, wherein said means for connecting comprises an idler pulley, said cable lengths each passing around said idler pulley and joining with each other.

3. Apparatus according to claim 2, including means interconnecting both ends of said cable lengths after they have wrapped around said pulley means.

4. A recreational vehicle comprising a frame, a seat for a rider mounted on said frame, a drive wheel mounted on said frame and power means for rotating said drive wheel, said power means comprising a pair of cranks adapted to be rotated through a partial revolution by the feet of said rider between first and second positions, two lengths of cable, each connected to a separate one of said cranks, means interconnecting said lengths of cable for returning each of said cranks to said first position by rotating the same in one direction while the other crank is rotated in the opposite direction from its said first position toward its said second position, drive train means connected to said cranks for rotating said drive wheel, said drive train means comprising a drive shaft connected in operative driving relationship with said drive wheel, means including a pair of one-way clutches for connecting said cranks individually to said clutches, and means connecting each of said lengths to an individual one of said one-way clutches, whereby said drive shaft is driven alternately by said cranks through alternate ones of said lengths, and including pulley means connected to each of said cranks, each of said lengths being wrapped completely around said pulley means, whereby force imparted to each of said cranks is imparted to said lengths through friction between each length and its respective pulley.

5. A recreational vehicle comprising a frame, a seat for a rider mounted on said frame, a drive wheel mounted on said frame and power means for rotating said drive wheel, said power means comprising a drive shaft and a pair of cranks operatively connected to said drive shaft and adapted to be rotated through a partial revolution by the feet of said rider between first and second positions, two lengths of cable, each connected to a separate one of said cranks, means interconnecting said lengths of cable for returning each of said cranks to said first position by rotating the same in one direction while the other crank is rotated in the opposite direction from its said first position toward its said second position, a driving sprocket mounted on said drive shaft, a driven sprocket mounted for rotation with said drive wheel, a drive train interconnecting said driving sprocket with said driven sprocket, and pivot means for pivotally mounting said drive wheel to said frame at a point displaced above the axis of said driven sprocket, and spring means for urging said drive wheel to pivot about said pivot means toward a position out of contact with the ground, said chain having sufficient slack to allow such pivoting, the force of said spring being overcome by the tension of said chain during application of power from said peddles to said drive wheel.

6. Apparatus according to claim 5, wherein said front and rear supports are skates.

7. A recreational vehicle comprising a frame, a seat for a rider mounted on said frame, means for steering said vehicle, said steering means comprising a pair of wheels located toward the front and toward the rear of said vehicle, respectively, for supporting said vehicle on the ground, handle means for independently adjusting the attitude of said front and rear wheels for independently steering the front and rear of said vehicle, means for mounting said handle for rotation about two different axes, and means for steering said front and rear wheels, respectively, in response to rotation of said handle about said two axes.

8. Apparatus according to claim 7, including a bell crank operatively connected to said handle, a cable connected to said bell crank, means for pivotally mounting one of said wheels for steering about an axis inclined to the horizontal, and means for connecting said cable to said mounting means for steering one of said wheels in response to rotation of said bell crank.

9. Apparatus according to claim 24 including a pulley connected to said mounting means, said cable being wrapped around said pulley, a lug connected to said cable and received in a recess of said pulley for preventing slippage between said cable and said pulley, and means for operatively connecting both ends of said cable to said bellcrank whereby rotation of said bellcrank rotates said pulley for steering said wheel.

10. A recreational vehicle comprising a frame, a seat for a rider mounted on said frame, means for steering said vehicle, said steering means comprising a pair of supports located toward the front and toward the rear of said vehicle respectively, for supporting said vehicle on the ground, and manually operated means for independently adjusting the attitude of said front and rear supports for independently steering the front and rear of said vehicle, a detent means for normally returning the position of said manually operated means to a central position corresponding to a straight ahead attitude of said supports, said detent means incorporating a pin and slot linkage, said slot being V-shaped and adapted to receive said pin, and means resiliently biasing said pin toward the apex of said slot, said straight ahead attitude corresponding to the position of said pin at the apex of said slot.

11. Apparatus according to claim 10, wherein said mannualy operated steering means comprises a pair of handles, one for each hand of said rider, said handles being independently pivotable about plural axes for independently controlling the steering of said three wheels.

12. Apparatus according to claim 11, including means connected to said linkage for steering the wheel which is approximately on the center line of said vehicle, whereby that wheel may be steered by operating either of said handles and the other two wheels are steered by said handles individually.

13. Apparatus according to claim 10, including means connected to said handles and operative in response thereto for steering two of said wheels in opposite directions, to brake the movement of said vehicle.

14. A recreational vehicle comprising a frame, a seat for a rider mounted on said frame, means for steering said vehicle, said steering means comprising a pair of wheels located toward the front and toward the rear of said vehicle respectively, for supporting said vehicle on the ground, and manually operated means for independently adjusting the attitude of said front and rear supports for independently steering the front and rear of said vehicle, and including a third wheel whereby said vehicle is supported on three wheels, one of said three wheels being approximately on the longitudinal center line of said vehicle and the other two wheels straddling said longitudinal center line, said manually operated means adapted to stear all three wheels independently.

15. Apparatus according to claim 14, including means for pivotably mounting each of said handles on said frame about two different pairs of axes, and linkage connected between said handles for urging said handles to rotate together about one of said pairs of axes.

* * * * *